United States Patent Office 3,215,532
Patented Nov. 2, 1965

3,215,532
PROCESS OF MAKING POWDERED ICE CREAM MIX
Harold J. Bassett, Prairie Village, Kans., assignor, by mesne assignments, to Top-Scor Products, Inc., Kansas City, Kans., a corporation of New York
No Drawing. Filed July 15, 1963, Ser. No. 295,193
1 Claim. (Cl. 99—56)

This invention relates to food products, and more particularly to cold lacteal confections.

In recent years, the so-called "soft" ice cream or ice milk has become popular along with "milk shakes" or "malted milks" as refreshing confections commonly sold from small neighborhood stands. These products are usually not pre-packaged, but rather they are maintained in the form of a liquid mix within a refrigeration apparatus. Upon receipt of an order, the liquid mix is entrained with air under violent agitation and served at the appropriate temperature of the desired consistency, that is, about 20° F. for soft ice cream and 28° F. for shakes.

The liquid mix is usually purchased from a supplier and, prior to use, a measured quantity thereof is poured into the appropriate apparatus reservoir. The liquid must be carefully sealed in packages by the supplier and continually maintained under refrigeration; nevertheless, if not used within a short time, that is, a very few days, it becomes sour and unfit for use.

Attempts have been made to provide a substitute for the liquid mix in the form of a dry powder which is more easily handled, has a greater shelf life and does not require storage refrigeration. To the inventor's knowledge, such attempts have been failures due to inability to maintain the delicate taste following drying, storage and reconstitution, and the failure of the powder to go properly into solution in use. Also, such attempts ofter required the addition of selected ingredients in the powdered state following drying which added considerably to the cost of production.

Powdered mixes for liquid lacteal beverages have been suggested, for example malted milk type beverages, however, the reconstituted product generally included strong flavoring components for masking the off-taste produced during drying, storage and subsequent reconstitution. Further, such formulations required high shear mixing in the presence of ice for proper reconstitution.

The principal objects of the present invention are: to provide a dry powdered mix adapted to produce a liquid mix for forming into palatable cold lacteal confections such as ice cream, soft ice cream and milk shakes without masking flavoring components; to provide such a powdered mix which is complete following drying and may be easily reconstituted with room temperature tap water and without the necessity for high shear mixing; to provide such a mix which has a greatly extended shelf life and does not require refrigeration during storage; to provide such a powdered product which reconstitutes into ice cream, soft ice cream or milk shakes having substantially the same full-bodied delicate flavor as that produced by liquid concentrates; and to provide such a cold lacteal confection forming product which is easily and inexpensively manufactured and may be stored in containers not hermetically sealed.

Other objects and advantages of this invention will become apparent from the following description wherein are set forth by way of example certain embodiments of this invention.

This invention contemplates the dehydration of a complete liquid mix. This mix, however, varies from conventional mixes in that the milk solids are of relatively large particle size. The mix is spray dried under controlled conditions producing a substantially dry powder adapted for easy handling and packaging.

The powder producing mix preferably uses fresh ingredients including whole milk or skim milk, and unlike the procedure in all known lacteal formulas intended for dehydrating, the milk is not homogenized which would decrease the milk solids particle size. The sweetening agent is preferably included in ultimate concentration in the liquid mix formula, unlike prior lacteal formulas in this field wherein it was found practical to include only a portion of the sweetening agent.

The complete liquid mix, after spray drying, forms a powder which is easily reconstituted, requiring only the addition of tap water at room temperature in the amount removed during dehydration, and mixing prior or during introduction into the refrigeration and dispensing apparatus reservoir.

Although the beginning liquid mix may vary in the relative amounts of the various ingredients contained therein, a suitable mix is composed of the following, by weight:

| Ingredient | Shake Base, percent | Soft Serve Ice Cream Base, percent |
|---|---|---|
| Sugar (sucrose) | 9 | 13 |
| Ascorbic acid | .005 | .005 |
| Butterfat | 4½ | 4½ |
| Milk-solids-not-fat | 11 | 13 |
| Stabilizer-emulsifier | .35 | .5 |
| Water | Balance | Balance |

The water is added in the amount required to obtain the proper concentrations. As noted above, the milk solids are acquired from non-homogenized milk to obtain fat particles of relatively large size. It is believed that the resulting minimum of fat surface contributes materially to the resulting stability of the dried mix in flavor and shelf life. The sweetening agent is preferably in the form of sucrose (cane or beet sugar) as dextrose (corn sugar) does not spray well during the drying process. It is believed that the inclusion of high sugar concentrations in the mix during drying produces a coating on the large fat particles which tends to reduce inclination toward souring. The ascorbic acid acts as a preservative to cut down the oxidation of fats which would tend to occur during the processing and storage giving an off-color flavor.

The complete liquid mix is spray dried in conventional apparatus at a differential pressure of approximately 2500 p.s.i. through a spray nozzle and into a spray chamber containing a maximum air temperature of approximately 300 degrees F. decreasing to about 185 degrees F. at the exit. It is estimated that these conditions provide a maximum temperature of approximately 110° F. in the ingredients undergoing dehydration.

The stabilizer-emulsifier is used in the same manner as conventional mixes and may comprise, for example, Irish moss extractive or locust bean gum for the stabilizer and monodiglycerides and/or polyoxyethelene monooleate or similar compounds for the emulsifier.

In mixing the ingredients to form the complete liquid mix prior to spraying, shear forces must be kept below the point where fat particles will be substantally reduced in size, however, complete mixing is necessary. It is desirable to use care in avoiding the incorporation of air into the mix so as to prevent the formation of foam which tends to interfere with the spraying process and expose the ingredients to oxidation.

The shelf life of the dry mix in containers not hermetically sealed has been found to be at least 30 days at room temperature without loss of the delicate flavor essential to marketing the reconstituted product.

In reconstituting the powder, ordinary tap water at room temperature is added in the amount that moisture was removed during the dehydrating process and the mixture is stirred until smooth whereupon it is introduced into the dispensing apparatus. The resultant product has been found to be indistinguishable in taste, consistency and appearance from the confections produced by conventional liquid concentrate methods.

It is to be understood that although the frozen product referred to herein by way of example has been identified by the popular designation "soft ice cream," it is actually "soft ice milk" because of the low butterfat percentage. It has been found, however, that the butterfat content in the above-noted formula may be increased above 10 percent, thereby qualifying the product as a true ice cream mix, and the reconstituted product, when frozen at low temperature, produces conventional ice cream which has good texture, flavor and appearance.

It is to be understood that while certain forms of this invention have been described, it is not to be limited to the specific formulation and processes herein described except insofar as such limitations are included in the claim.

What I claim and desire to secure by Letters Patent is:

The process of making a dry powdered extended shelf-life mix for storage and later reconstitution with water to a liquid mix for forming a complete ice cream confection having the taste characteristics of wet mix ice cream confections comprising: mixing a complete liquid lacteal confection mix including approximately 9 to 13 percent sucrose, 4½ percent butterfat, 11 to 13 percent milk-solids-not-fat, a fat oxidation preventative, a stabilizer-emulsifier, and moisture using for the lacteal portions milk solids of the size found in non-homogenized milk and under conditions wherein shear forces are maintained below the point where fat particles will be substantially reduced in size, and dehydrating the complete liquid mix under conditions which produce a maximum temperature of approximately 110 degrees F. for the mix ingredients.

References Cited by the Examiner

UNITED STATES PATENTS

| | | | |
|---|---|---|---|
| 1,236,700 | 8/17 | Gere | 99—203 X |
| 1,374,555 | 4/21 | Dick | 99—203 |

FOREIGN PATENTS

| | | |
|---|---|---|
| 552,561 | 4/43 | Great Britain. |
| 658,854 | 10/51 | Great Britain. |

OTHER REFERENCES

Reid et al., "The Effect of Processing on the Dispersion of Fat in an Ice Cream Mixture," in Abstracts of Ice Cream Literature, vol. 1, p. 103 (1927).

Sommer, "Theory and Practice of Ice Cream Making," 1951, page 169.

A. LOUIS MONACELL, *Primary Examiner.*